Patented May 10, 1949

2,469,867

UNITED STATES PATENT OFFICE 2,469,867

GLASSES HAVING A LOW COEFFICIENT OF EXPANSION

André Danzin, Paris, France, assignor to Societe Francaise Radio Electrique, a corporation of France No Drawing. Application January 4, 1947, Serial No. 720,299. In France January 5, 1946

2 Claims. (Cl. 106—53)

For many purposes it is desirable to employ glasses which exhibit the following properties, in combination:

High softening temperature, so that deformation in vacuo, for example, only takes place at about 600° C.

High resistance to attack by water and other chemical agents.

A high degree of suitability for working by blow-pipe, or blow-lamp, and by pressing.

A degree of chemical stability sufficient for the purposes of making vacuum tubes, wireless valves and the like by present day methods.

Good electrical qualities, and, in particular, dielectric losses which are very much lower than those of the existing glasses having a borosilicate base.

According to the invention, glasses which combine all these properties are obtained by associating the following substances in their composition within the limits of the proportions stated:

| | Per cent |
|---|---|
| $SiO_2$ | 52 to 55 |
| $Na_2O$ | 0.4 to 0.9 |
| $Al_2O_3$ | 4 to 6 |
| $B_2O_3$ | 6 to 10 |
| ZnO | 2 to 4 |
| PbO | 10 to 16 |
| BaO | 8 to 12 |
| CaO | 3 to 8 |
| MgO | 0 to 3 | the total percentage corresponding to all the three ingredients, PbO, BaO and CaO, being at least equal to 24%.

Within the range of the glasses thus defined, it will be observed that the high content of PbO, CaO and BaO permits of obtaining good electrical performances and, in addition, the presence of lime raises the softening temperature, while the alumina acts as a stabiliser. Finally, the complex nature of the chemical composition permits of melting at low temperature and facilitates refining. Manganese may also be introduced to regulate the critical viscosity temperatures to a substantial extent.

A glass having the following composition is cited as an example of glass according to the invention. This glass readily fuses on to molybdenum and it has a Littleton point at 725° C.:

| | Per cent |
|---|---|
| $SiO_2$ | 54 |
| $Na_2O$ | 0.7 |
| $Al_2O_3$ | 5 |
| MgO | 1 |
| ZnO | 2.5 |
| $B_2O_3$ | 8 |
| PbO | 12 |
| BaO | 10.3 |
| CaO | 6 |
| $As_2O_3$ | 0.5 |

I claim:

1. A special glass which has a low coefficient of expansion, a high softening temperature, equal, at least, to 600° C. and high resistance to chemical agents, which is easy to work, is particularly suited for the manufacture of vacuum tubes, more especially radio-electric tubes, and which has good electrical qualities, said glass being characterised in that it is composed of the following elements:

| | Per cent |
|---|---|
| $SiO_2$ | 52 to 55 |
| $Na_2O$ | 0.4 to 0.9 |
| $Al_2O_3$ | 4 to 6 |
| $B_2O_3$ | 6 to 10 |
| ZnO | 2 to 4 |
| PbO | 10 to 16 |
| BaO | 8 to 12 |
| CaO | 3 to 8 |
| MgO | 0 to 3 | the total percentage of all the three ingredients PbO, BaO and CaO being equal to at least 24%.

2. A glass according to claim 1, of which the Littleton point lies at 725° C., said glass being suited for fusing onto molybdenum and being characterised in that it is composed of the following elements:

| | Per cent |
|---|---|
| $SiO_2$ | 54 |
| $Na_2O$ | 0.7 |
| $Al_2O_3$ | 5 |
| MgO | 1 |
| ZnO | 2.5 |
| $B_2O_3$ | 8 |
| PbO | 12 |
| BaO | 10.3 |
| CaO | 6 |
| $As_2O_3$ | 0.5 |

ANDRÉ DANZIN.

REFERENCES CITED

The following references are of record in the file of this patent:

UNITED STATES PATENTS

| Number | Name | Date |
|---|---|---|
| 2,297,453 | Berger et al. | Sept. 29, 1942 |